United States Patent [19]

Hübner et al.

[11] Patent Number: 5,018,520

[45] Date of Patent: May 28, 1991

[54] AERATION OR BREATHING APPARATUS

[75] Inventors: Hans-Jörg Hübner; Heribert Rische, both of Dortmund, Fed. Rep. of Germany

[73] Assignee: Gesellschaft für Gerätebau mbH, Dortmund, Fed. Rep. of Germany

[21] Appl. No.: 326,691

[22] Filed: Mar. 21, 1989

[30] Foreign Application Priority Data

Mar. 21, 1988 [DE] Fed. Rep. of Germany ....... 3809406

[51] Int. Cl.$^5$ ..................... A61M 15/00; H01M 2/12
[52] U.S. Cl. ................... 128/205.12; 429/56; 429/149; 429/156; 429/159
[58] Field of Search ............ 429/53, 54, 55, 56, 429/149, 156, 159; 128/205.12

[56] References Cited

U.S. PATENT DOCUMENTS

| 3,939,011 | 2/1976 | Zaleski | 429/54 |
| 4,115,629 | 9/1978 | Dey et al. | 429/56 |
| 4,397,919 | 8/1983 | Ballard | 429/53 |
| 4,458,680 | 7/1984 | Childers et al. | 128/201.29 |
| 4,476,200 | 10/1984 | Markin et al. | 429/56 |
| 4,484,691 | 11/1984 | Lees | 220/89 |
| 4,505,993 | 3/1985 | Skinner | 429/100 |
| 4,622,852 | 11/1986 | James et al. | 73/865.6 |
| 4,646,732 | 3/1987 | Chiou | 128/206.12 |
| 4,722,874 | 2/1988 | Marchak | 429/56 |
| 4,733,480 | 3/1988 | Hutchins | 34/104 |
| 4,899,740 | 2/1990 | Napolitano | 128/202.22 |
| 4,939,050 | 6/1990 | Toyosawa et al. | 429/241 |

FOREIGN PATENT DOCUMENTS 329926 3/1903 France ............ 429/159

Primary Examiner—Edgar S. Burr
Assistant Examiner—Eric P. Raciti
Attorney, Agent, or Firm—Nils H. Ljungman & Associates

[57] ABSTRACT

Lithium batteries used for an aeration or breathing apparatus, such as gas masks or protective suits, are enclosed in a housing, and the enclosure has a predetermined breaking point to release gases which may accumulate in the interior. The housing surrounding the lithium batteries has a closure, which opens when the compressed gases are released, to allow the gases to be safely discharged to the outside.

19 Claims, 3 Drawing Sheets

AERATION OR BREATHING APPARATUS

BACKGROUND OF THE INVENTION

1. Field of the Invention

This invention relates to an aeration or breathing apparatus and, in particular, for gas masks and/or protective clothing where the aeration or breathing apparatus produces the pressure required to overcome fluid flow resistance and/or produce a pressure or an overpressure in the apparatus.

2. Description of the Prior Art

Gas masks are generally known as BC gas masks. The purpose of these masks is to produce harmless and breathable air from contaminated ambient air. For this purpose, there are filters in the breathing passages of the gas mask. The filters are customarily activated carbon filters. To overcome fluid flow resistance of such filters, the user must apply so much energy that the use of gas masks is very strenuous. To overcome this flow resistance, the prior art includes the use of auxiliary aeration equipment. Such auxiliary aeration equipment comprises a fan, which is preferably located behind the filter, and therefore acts as a suction fan and pulls the breathing air through the filter. Optionally, the suction draft or flow can be adjusted so that an overpressure develops in the gas mask in relation to the ambient atmosphere.

For the operation of an aeration or breathing apparatus, German Laid Open Patent Application No. 35 23 097 proposes the use of batteries. In that case, for the evaluation of a battery, its weight coefficient is a criterion of particular importance. The weight coefficient is the current supplied, taking the weight of the battery into consideration.

German Utility Model No. G84 36 184 discloses a housing for energy supply units which have batteries, whereby this housing is designed as an element to provide protection against a possible overpressure inside the housing, with a closing by means of a rupture disc and an aeration hole.

U.S. Pat. No. 4,484,691 discloses the manufacture of lithium batteries with a metal jacket, which has a predetermined breaking point.

OBJECT OF THE INVENTION

The object of the invention is to use particularly efficient batteries for an aeration or breathing apparatus. The invention is therefore based on lithium batteries or similar batteries. Lithium batteries have so far not been used in aeration or breathing equipment for gas masks. Before lithium batteries can be used, there are significant problems which must be overcome. These problems include the operating pressure of such batteries. The operating pressure can easily be 5 or 6 Bar. The operating pressure, however, can increase to an extreme degree which is the case when a short circuit occurs. However, other material defects or operating errors can produce the same effect. In such a case, there is a danger of explosion. The danger of explosion is all the greater, since the lithium batteries must be equipped with a metal jacket to control the normal operating pressure. For the above reason, lithium batteries or similar batteries have so far not been used for aeration or breathing equipment.

SUMMARY OF THE INVENTION

This invention assumes that lithium batteries basically have a predetermined breaking point. When assembled as part of a battery pack, the discharge direction is undefined The battery pack housing must channel the discharge in a direction which does not pose any danger. A rupture disc is frequently unsuitable for this purpose. Because the rupture disc must be designed thin enough for low discharge pressures, it can be destroyed without a discharge occurring, such as during rough handling of the aeration or breathing apparatus. By means of the plug, in accordance with this invention, the opening pressure can be set with much greater precision than a rupture disc, e.g. to a pressure between 1 and 5 kg.

The arrangement of the plug on the bottom of the battery pack, in accordance with the invention, also has the effect that the gases which are discharged are not directed toward the person wearing the aeration or breathing apparatus.

An additional advantage of the plug is the controlled possibility of access after the battery has been used. The plug can be removed to prevent an explosion during storage of the used battery, until it is completely discharged.

The closing can optionally be formed by a circular opening in the bottom of the housing, which is closed by a plug. The plug sits in the opening, e.g. with a force fit. The opening pressure is set higher than the force fit. The opening pressure can also be controlled by means of a gasket (not shown), which is located on the plug or on the base of the container, and which produces the required application pressure.

It is advantageous if the plug is removable. Then the battery housing can be ventilated. To open the plugged housing, the plug can be provided with an edge, for example, and there can be a recess in the base of the housing, by means of which a suitable tool, e.g. a screwdriver, can be inserted under the edge of the plug, and the plug pried out.

Preferably, under the plug there is also a switch which is part of a circuit, by means of which the batteries can be completely discharged. Only when the battery has been completely discharged is it certain that lithium batteries will not experience an undesirable heating for the above reasons. In other words, after the use of lithium batteries, the residual battery charge is discharged in accordance with the invention.

There is a resistance in the circuit for the residual discharge operation. The resistance prevents a short circuit situation. There is also another switch which opens if excessive heating occurs, and thus interrupts the residual discharge. Preferably, a reversible switch is used, e.g. one which works on the principle of a bimetallic strip. These switches are also called poly-switches.

Accordingly, one aspect of the invention resides broadly in an apparatus for a gas mask or aeration device comprising a battery pack, a housing for the battery pack, the housing including a device to permit a build-up of pressure therewithin, and a device to protect against overpressurization of the housing due to pressure produced by the battery pack.

BRIEF DESCRIPTION OF THE DRAWING

The accompanying drawings illustrate preferred embodiments of the invention.

DESCRIPTION OF THE PREFERRED EMBODIMENT

Figure 1:
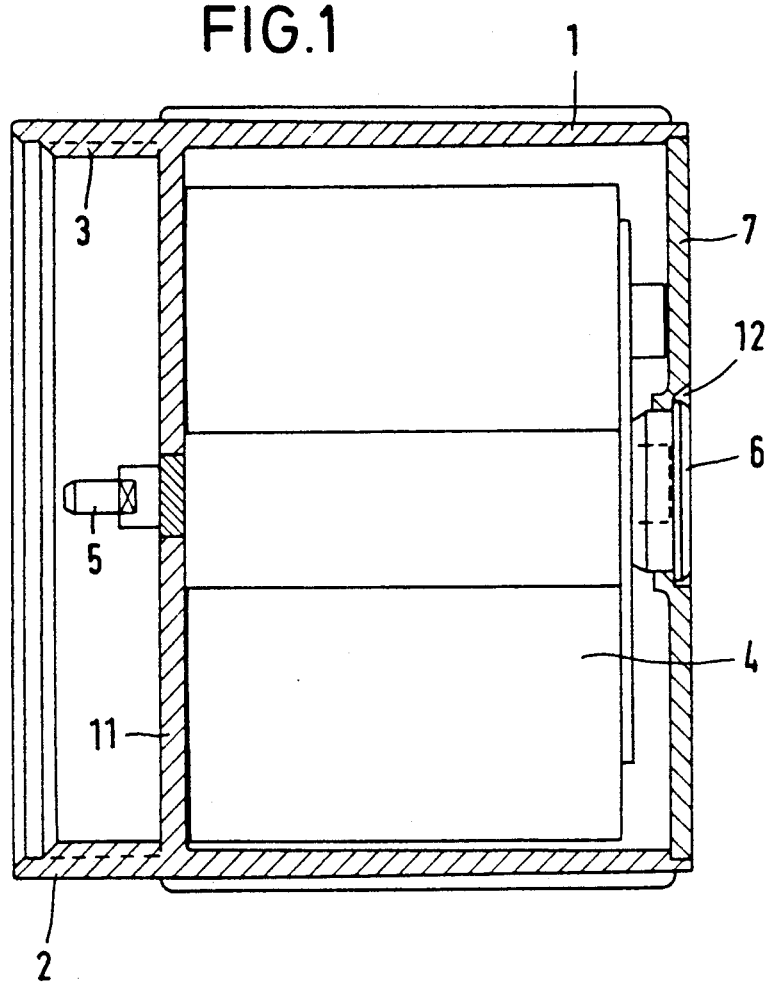
FIG. 1 is a sectional view of a battery pack of the invention, taken generally along the line I—I of FIG. 2.

FIG. 1 shows the battery pack for an aeration or breathing apparatus. The battery pack has a housing 1 with a housing portion 2 having an internally threaded portion 3. Instead of the thread 3, there can also be a bayonet closure or another type of quick-release closure. Essentially, these closures work on the basis of a tongue and groove, whereby the groove captures the tongue, and by turning the housing 1 in relation to the rest of the housing 2, both housings can be braced or engaged in relation to one another.

Figure 1A:
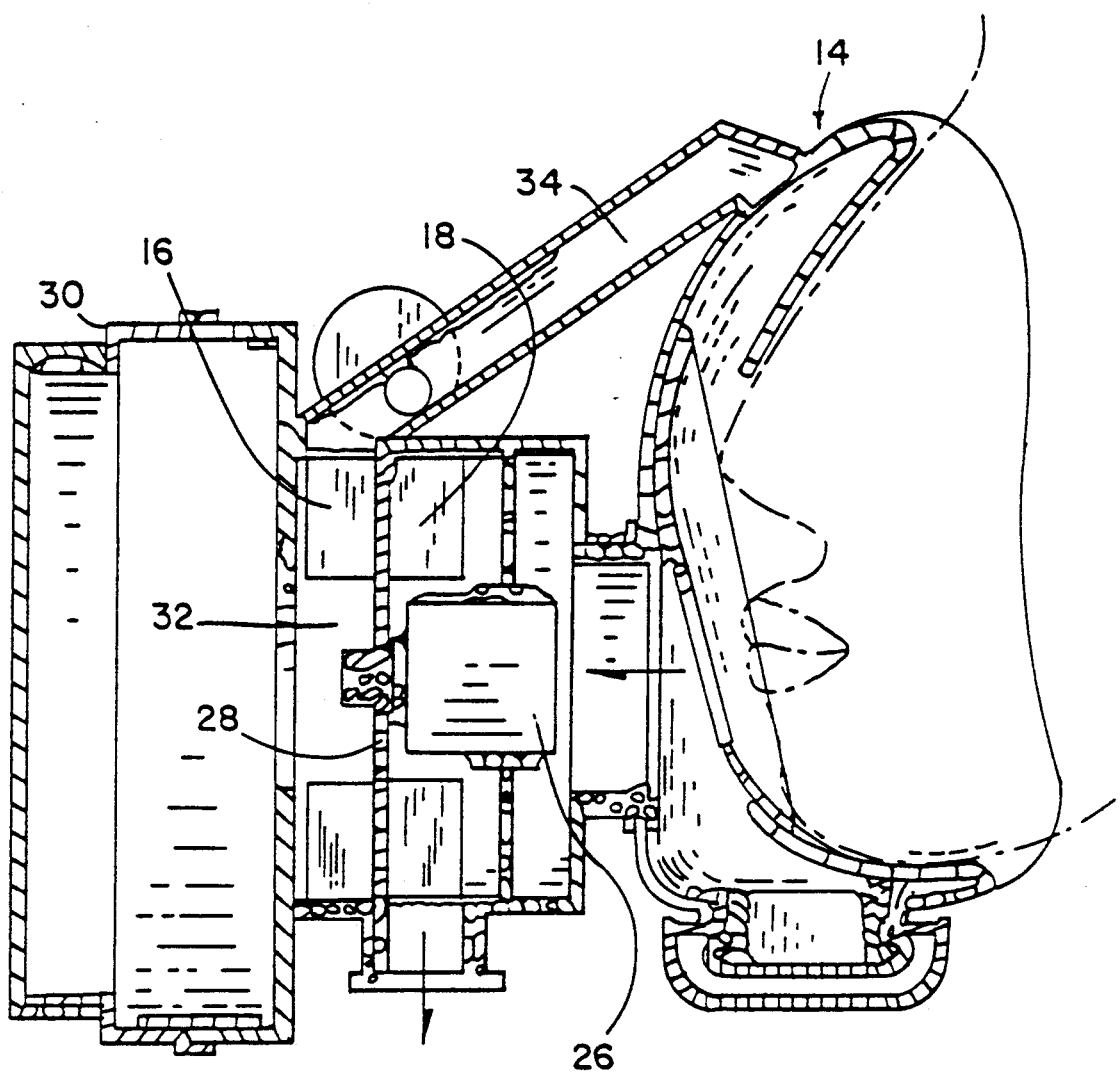
FIG. 1A is a sectional view of a prior art breathing apparatus.

As shown in FIG. 1A aeration or breathing apparatus 12 in the form of a gas mask includes a mask portion 14 with a ventilating or suction fan 16 an exhausting air fan 18 operated with an electric motor 26 for rotating a disc or wheel 28. The use of a blade wheel instead of an impeller is advantageous. The ventilating fan 16 in the embodiment is located behind a filter (not shown) housed in a canister 30, so that outside air is sucked in through the canister 30. The purified outside air is transported as breathable air through a suction chamber 32 and a delivery tube or flexible hose 34 to gas mask portion 14. Depending on the control of the ventilating fan 16, the fan 16 just overcomes the flow resistance of the air in the filter. However, the ventilating fan 16 can also be operated with such force that an overpressure develops in the gas mask. U.S. Pat. Nos. 4,549,542, 4,590,951 and 4,646,732 disclose breathing apparatus suitable for use with the present invention and the disclosure of which are intended to be incorporated herein by reference.

Optionally, the gas mask can be part of an overall protective suit (not shown), or the aeration or breathing device can be connected to the protective suit as an air conditioning apparatus. Protective suits suitable for use with this invention are disclosed in U.S. Pat. Nos. 4,146,933 and 4,458,680, the disclosure of which are also incorporated herein by reference.

The battery pack illustrated in FIG. 1 has five lithium batteries 4 with a power of 7 to 10 Ampere hours (Ah) at 2.8 to 3 Volts (V). The lithium batteries are connected in series and can be connected by means of a plug 5 by conventional electrical conductors to the aeration apparatus. Accordingly, there is a socket for the plug 5 in the corresponding end of the aeration or breathing apparatus housing.

Figure 2:
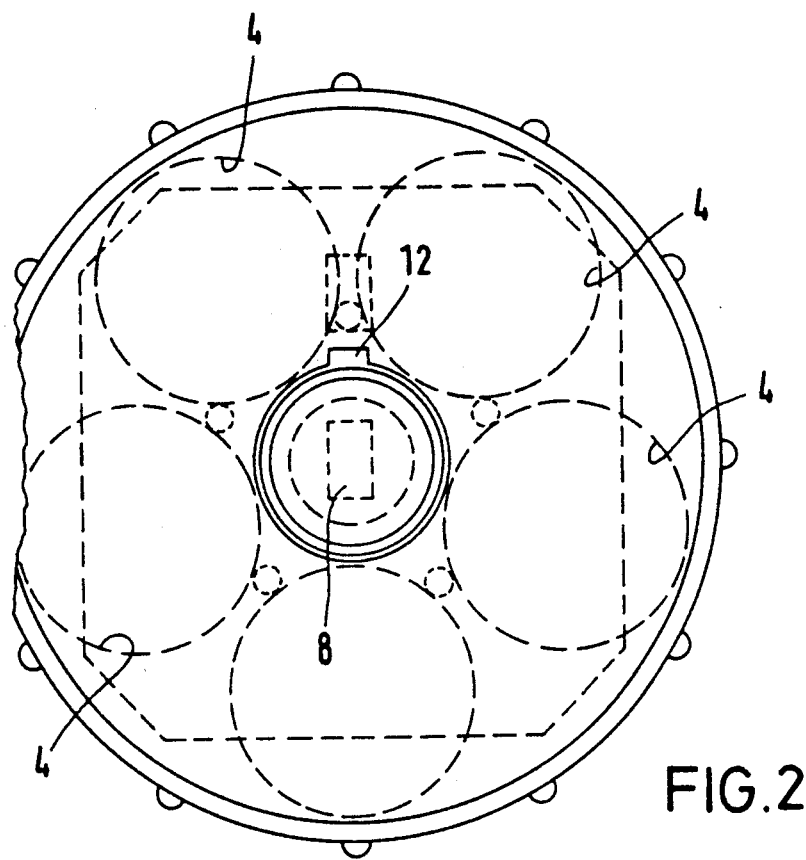
FIG. 2 is a plan view of the bottom of the battery pack of FIG. 1.

All the lithium batteries 4 have a steel jacket. Each steel jacket has a predetermined breaking point which opens if an unacceptably high pressure accumulates, and allows the gases causing the pressure to escape. The gases then flow toward a plug 6 in the base 7 of the housing 1. The plug 6, as shown in FIG. 2, has a disk shape with chamfered edges and is force-fitted into the base 7. The force fit is designed so that the plug cannot come loose by itself as a result of temporary vibrations of the aeration or breathing apparatus, even if the aeration or breathing apparatus is dropped, but yields immediately to the pressure of the oncoming gases. Then the gases can flow out to vent the housing 1, and the danger of explosion is eliminated.

Figure 4:
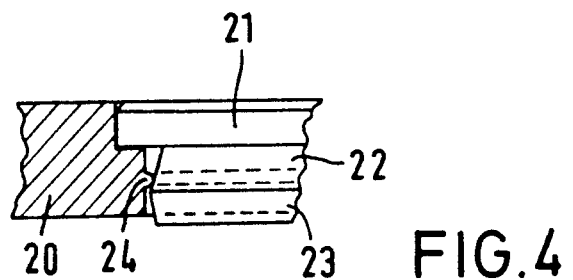
FIG. 4 is a sectional view, with portions broken away, of an alternative plug arrangement of the invention.

In another embodiment illustrated in FIG. 4, the plug 21 is provided with a conical configuration that includes a first conical portion 22 integral with a second conical portion 23. With this arrangement the conical portions 223 and 23 are positioned back to back. The diameter of the conical portion 22 increase toward the conical portion 23, and the diameter of the conical portion 23 decreases away from the conical portion 22. The taper is between 0.1 and 1 degree to the center axis, and is a function of the plastic used and the desired opening pressure. The plug 21 interacts with a spring 24 of the housing base 20 at the point of maximum diameter on the plug 21. The spring 24 is between 0.05 and 0.2 mm thick. Thus the plug and bottom parts, which determine the opening pressure, are so small that their special function is difficult to see with the naked eye.

The direction of flow of the gases, when the aeration or breathing apparatus is worn on the hip, is not directed toward the user of the apparatus.

Figure 3:
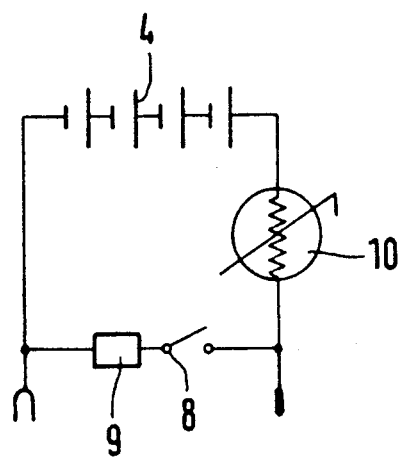
FIG. 3 is a schematic of a circuit that may be used, according to the invention, for residual discharge of a battery pack.

The plug 6 can also be opened by hand, in the absence of a gas discharge which occurs when the battery pack is largely discharged, and can no longer be used as a sufficient energy source for the aeration or breathing apparatus. Opening the plug 6 makes a switch 8 accessible. By activating the switch 8, a removal of the residual charge of the batteries takes place. For that purpose, the batteries illustrated in FIG. 3 are connected as follows: the switch 8 closes a circuit which includes, in addition to the batteries 4, a resistance 9 and a poly-switch 10. The resistance 9 prevents a short circuit when there is a high current or a high amount of heat produced by the batteries 4. The switch 10 is a thermostatic switch, which interrupts the circuit if excessive heating occurs during the residual discharge, and closes again after sufficient cooling has taken place.

The residual discharge makes certain that the battery pack can be discharged completely and easily.

The invention also provides that the housing 1 has a welded base 7 and a wall 11 which is integral with the housing 1. Optionally, the base 7 can also be an integral part of the housing 1.

To open the plug, the opening for the plug 6 has a recess 12. The recess 12 is designed so that the seal between the base 7 and the plug 6 is not endangered, but a screwdriver or a similar tool can be pushed under one edge of the plug 6, and the plug 6 can be pried out.

In summing up, one aspect of the invention resides in a battery pack for aeration apparatus, in particular for a gas mask and/or protective suit, whereby the aeration apparatus produces the pressure required to overcome the flow resistance and/or an overpressure, and there is a closure, which opens when an unacceptable internal battery pressure is reached, on the base of the battery pack, which comprises a plug and/or circuit for the residual discharge of the battery.

Another aspect of the invention resides in a battery pack in which the closure has a circular shape when viewed from above.

An additional aspect of the invention resides in a battery pack in which a spring and/or double cone plug may be used as the closing parts for the battery pack.

A further aspect of the invention resides in a battery pack in which the plug has an edge, and the base of the battery pack has a recess.

Another aspect of the invention resides in a battery pack having a switch for the residual discharge of the batteries located underneath the plug.

A yet further aspect of the invention resides in a battery pack having a resistance and a poly-switch in the circuit for removing the residual battery charge.

An additional aspect of the invention resides in a battery pack having a quick-release closing for the connection to the aeration apparatus.

Another aspect of the invention resides in a battery pack having a housing with an insertable base.

The invention as described hereinabove in the context of a preferred embodiment is not to be taken as limited to all of the provided details thereof, since modifications and variations thereof may be made without departing from the spirit and scope of the invention.

What is claimed is:

1. Personal gas mask apparatus comprising:
   means for inducing a flow of breathable air into a gas mask;
   a battery pack for powering said means for inducing a flow of air;
   circuit means for electrically connecting said battery pack to said means for inducing a flow of air;
   a housing surrounding said battery pack, said housing including an opening for venting a build-up of pressure produced by said battery pack in said housing, and
   plug means for closing said housing opening
   means positioned in said opening between said housing and said plug means for forming a force fit of said plug means with said housing in said opening;
   said means for forming a force fit being displaced from said opening when the pressure in said housing overcomes the force fit to forcibly expel said plug means from said housing to protect against overpressurization of said housing due to pressure produced by said battery pack.

2. The personal gas mask apparatus according to claim 1, wherein said plug means includes a disc with chamfered edges for frictionally engaging said opening in said housing.

3. The personal gas mask apparatus according to claim 1, wherein said plug means includes a plug positioned in said opening in a force fit with said housing and directed away from a user of said gas mask.

4. The personal gas mask apparatus according to claim 3, which includes;
   means for engaging said plug to said housing in said opening with a preselected pressure; and
   said plug being releasable from engagement with said housing when the pressure within said housing exceeds a preselected pressure to vent said housing.

5. The personal gas mask apparatus according to claim 4, wherein said means for engaging said plug to said housing includes;
   means projecting said from housing into said opening for contacting said plug with a preselected frictional force to retain said plug positioned in said opening in engagement with said housing; and
   said means projecting from said housing being disengaged from engagement with said housing when the pressure within said housing exceeds said preselected pressure.

6. The personal gas mask apparatus according to claim 2, wherein said plug means has a conical configuration formed by a first conical portion and a second conical portion;
   said first and second conical portions being integrally connected where said first conical portion has a diameter increasing in magnitude toward said second conical portion and said second conical portion has a diameter decreasing in magnitude away from said first conical portion.

7. The personal gas mask apparatus according to claim 1, which includes;
   spring means positioned between said housing and said plug means for coacting with said plug means to retain said plug means engaged to said housing within said opening; and;
   said spring means being releasable from engagement with said housing when the pressure in said housing exceeds said preselected magnitude.

8. The personal gas mask apparatus according to claim 1, wherein said circuit means includes a switch movable between an open position and a closed position for generating residual discharge of said battery pack, said switch being located underneath said plug means in said housing, and;
   said switch in said closed position closing said circuit means and said switch in said open position opening said circuit means to discharge said battery pack.

9. The personal gas mask apparatus according to claim 1, wherein said circuit means includes an electrical circuit having a switch for opening said electrical circuit for residual discharge of said battery pack.

10. The personal gas mask apparatus according to claim 1, further including connector means mounted on said housing oppositely of said plug means for electrically connecting said battery pack to said means for inducing a flow of breathable air.

11. The personal gas mask apparatus according to claim 1, wherein said housing includes a wall portion having said opening for receiving said plug means; and
    means for connecting said wall portion to said housing.

12. A portable breathing apparatus for an individual, which apparatus includes;
    means for inducing a flow of breathable air into the breathing apparatus;
    means for powering said means for inducing a flow of air, said means for powering comprising:
    a battery pack;
    a housing surrounding said battery pack, said housing including removable plug means for venting a build-up of pressure within said housing; and pressure release means for frictionally engaging said plug means to said housing, said pressure release means being disengaged from said housing to vent said housing to protect against overpressurization of said housing when the pressure produced by said battery pack exceeds a preselected magnitude.

13. The portable breathing apparatus according to claim 12, wherein said pressure release means includes circuit means for actuating residual discharge of said battery pack, and;
    said circuit means being located in said housing closely adjacent said means for venting.

14. The portable breathing apparatus according to claim 12, in which said battery pack includes lithium batteries.

15. The portable breathing apparatus according to claim 14, wherein said pressure release means includes an electrical circuit connected to said batteries and having a switch positioned in said housing oppositely of said means for venting, and;

said switch movable between an open position to open said electrical circuit to discharge said batteries and a closed position to close said electrical circuit.

16. The portable breathing apparatus according to claim 15, which further includes a pressure responsive plug positioned in frictional engagement with said means for venting a build-up of pressure in said housing.

17. Battery pack apparatus for powering an aeration device, said battery pack apparatus comprising:

a battery pack;

a housing for enclosing said battery pack, said housing including vent means for permitting a release of pressure produced by said battery pack within said housing, and;

plug means co-acting with said vent means for frictionally engaging said plug means to said housing, said plug means being releasable from said vent means when the pressure in said housing exceeds a predetermined magnitude to protect against overpressurization of said housing due to pressure produced by said battery pack.

18. The battery pack apparatus according to claim 17, wherein said plug means includes a pressure responsive plug releasably connected to said vent means in said housing;

said pressure responsive plug being positioned on said housing for disengagement from said vent means in a direction away from the aeration device;

said pressure responsive plug having an edge;

said vent means including a recess in said housing for receiving said edge;

circuit means for selectively discharging said battery pack, said circuit means being located in said housing in close proximity to said pressure responsive plug;

said battery pack including lithium batteries;

means for electrically connecting said batteries to the aeration device, and;

said housing including means for permitting access to the interior of said housing.

19. The battery pack apparatus according to claim 18, wherein said pressure responsive plug further includes a disc with chamfered edges;

said vent means including a spring member extending from said housing for frictionally engaging said disc chamfered edges to retain said disc in said vent means to close said housing, and;

said spring member exerting a spring force against said disc to retain said disc in place in said vent means until the magnitude of the pressure in said housing exceeds the spring force exerted by said spring member against said disc and said disc is dislodged from said housing permitting a release of the pressure in said housing through said vent means.

* * * * *

UNITED STATES PATENT AND TRADEMARK OFFICE
CERTIFICATE OF CORRECTION

PATENT NO. : 5,018,520

DATED : May 28, 1991

INVENTOR(S) : Hans-Jörg HÜBNER and Heribert RISCHE

It is certified that error appears in the above-identified patent and that said Letters Patent is hereby corrected as shown below:

In column 4, line 11, at the beginning of the line, delete "223" and insert --22--.

In column 4, line 12, after '22', delete "increase" and insert --increases--.

Signed and Sealed this

Twentieth Day of October, 1992

*Attest:*

DOUGLAS B. COMER

*Attesting Officer*      *Acting Commissioner of Patents and Trademarks*